(12) United States Patent
Wang et al.

(10) Patent No.: US 12,522,789 B2
(45) Date of Patent: Jan. 13, 2026

(54) LAUNDRY COMPOSITION AND PREPARATION METHOD THEREFOR

(71) Applicant: FOSHAN MAGIC CRYSTAL TECHNOLOGY DEVELOPMENT CO., LTD., Guangdong (CN)

(72) Inventors: Fengsheng Wang, Foshan (CN); Chiseng Wong, Foshan (CN); Jiyuan Wu, Foshan (CN); Yuzhuo Lin, Foshan (CN)

(73) Assignee: FOSHAN MAGIC CRYSTAL TECHNOLOGY DEVELOPMENT CO., LTD, Foshan (CN)

( * ) Notice: Subject to any disclaimer, the term of this patent is extended or adjusted under 35 U.S.C. 154(b) by 26 days.

(21) Appl. No.: 18/839,498

(22) PCT Filed: Jun. 25, 2024

(86) PCT No.: PCT/CN2024/101245
§ 371 (c)(1),
(2) Date: Aug. 19, 2024

(87) PCT Pub. No.: WO2025/102738
PCT Pub. Date: May 22, 2025

(65) Prior Publication Data
US 2026/0002099 A1    Jan. 1, 2026

(30) Foreign Application Priority Data
Jun. 14, 2024  (CN) .......................... 202410770018.3

(51) Int. Cl.
*C11D 17/04* (2006.01)
*C11D 1/14* (2006.01)
(Continued)

(52) U.S. Cl.
CPC .............. *C11D 17/06* (2013.01); *C11D 1/143* (2013.01); *C11D 1/146* (2013.01); *C11D 3/2065* (2013.01);
(Continued)

(58) Field of Classification Search
None
See application file for complete search history.

(56) References Cited

U.S. PATENT DOCUMENTS

| 4,806,261 A | 2/1989 | Ciallella et al. |
| 2003/0119695 A1* | 6/2003 | Weuthen .............. C11D 17/044 510/297 |

(Continued)

FOREIGN PATENT DOCUMENTS

| CN | 113045847 A | 6/2021 |
| CN | 117363432 A | 1/2024 |

(Continued)

OTHER PUBLICATIONS

Office Action issued on Apr. 22, 2025, in corresponding Japanese Application No. 2025-061592; 10 pages.
(Continued)

*Primary Examiner* — Lorna M Douyon
(74) *Attorney, Agent, or Firm* — Maier & Maier, PLLC

(57) ABSTRACT

A laundry composition and a preparation method therefor are provided, relating to the field of household necessities. The laundry composition includes a wrapping material, a functional material enveloped in the wrapping material, and an adhesive for bonding the wrapping material; the wrapping material is a film-forming material with laundry function; the functional material is selected from one or more of a softening particle, a fragrant particle, an active oxygen particle, and an enzyme preparation. By enveloping the functional material in the wrapping material with a detergent (Continued)

function, the laundry composition has integrated functions of cleaning, decontamination, pliancy, and fragrance-retaining. Furthermore, since the granular softening particle, a granular fragrant particle, a granular active oxygen particle, and a granular enzyme preparation are not directly added in the wrapping material, even if the wrapping material is formed by high-temperature drying, the functional materials will not fail.

8 Claims, 2 Drawing Sheets

(51) Int. Cl.
| | |
|---|---|
| *C11D 3/20* | (2006.01) |
| *C11D 3/22* | (2006.01) |
| *C11D 3/37* | (2006.01) |
| *C11D 3/386* | (2006.01) |
| *C11D 3/39* | (2006.01) |
| *C11D 3/40* | (2006.01) |
| *C11D 3/48* | (2006.01) |
| *C11D 3/50* | (2006.01) |
| *C11D 17/06* | (2006.01) |

(52) U.S. Cl.
CPC ............ *C11D 3/222* (2013.01); *C11D 3/3753* (2013.01); *C11D 3/3769* (2013.01); *C11D 3/40* (2013.01); *C11D 3/48* (2013.01); *C11D 3/50* (2013.01); *C11D 2111/12* (2024.01)

(56) References Cited

U.S. PATENT DOCUMENTS

| | | | |
|---|---|---|---|
| 2022/0064569 A1* | 3/2022 | Vinson | C11D 1/94 |
| 2024/0384470 A1* | 11/2024 | Tommarello | C11D 3/226 |

FOREIGN PATENT DOCUMENTS

| | | |
|---|---|---|
| JP | S6284199 A | 4/1987 |
| JP | 2001262188 A | 9/2001 |
| JP | 2002241799 A | 8/2022 |
| JP | 2022536528 A | 8/2022 |
| JP | 2023551285 A | 12/2023 |
| JP | 2023552118 A | 12/2023 |
| JP | 2024519680 A | 5/2024 |

OTHER PUBLICATIONS

Office Action issued on May 27, 2025, in corresponding Japanese Application No. 2025-061592; 10 pages.
Decision to Grant a Patent issued on Jun. 17, 2025, in corresponding Japanese Application No. 2025-061592; 7 pages.

\* cited by examiner

LAUNDRY COMPOSITION AND PREPARATION METHOD THEREFOR

FIELD

The present disclosure relates to the technical field of household necessities, in particular to a laundry composition and a preparation method therefor.

BACKGROUND

There are various forms of existing laundry products, including powdered laundry powders and laundry soap powders, block or sheet soaps and laundry tablets, liquid laundry detergent, and laundry detergent pods. Among them, laundry detergent pods and laundry tablets are more convenient to carry, but laundry detergent pods are usually wrapped with PVA film, which has high plastic content and is not environmentally friendly. Laundry tablets are high-tech laundry products in a different form, which have highly active substances and are dried into tablets. Laundry tablets disintegrate rapidly in water, making them easy to carry, accurately measured and low in transportation costs. As a result, they have become another favorite in the market. However, laundry tablets are usually made by high-temperature drying, such as Chinese Patent Application Pub. NO. CN117363432A of a soft decontamination laundry composition, a preparation method therefor, and laundry tablets. The temperature for preparing the laundry tablets is as high as 90-105° C., which leads to poor stability of enzymes, causing easy partial inactivation, so that selection range of the enzymes is narrowed and the addition amount needs to be increased.

Furthermore, the high-temperature preparation process of laundry tablets also leads to the inability to add essence microcapsules with good fragrance retention function, and only the conventional essence can be added for fragrance extraction. However, the conventional essence can easily consume surfactants, which leads to the decline of its decontamination ability. In addition, because the main component of laundry tablets is anionic surfactant or nonionic surfactant, while the main component of softener is cationic surfactant, if the softener is directly added to the laundry tablets, the softener will consume part of the anionic surfactant, resulting in a reduced decontamination effect and insufficient softening effect.

Therefore, the existing technology needs to be improved and developed.

SUMMARY

In view of the shortcomings of the prior art, a purpose of the present disclosure is to provide a laundry composition and a preparation method therefor, aiming to solve the defect of the single function of laundry tablets in the prior art.

To achieve the purposes, technical schemes of the present disclosure are as follows:

A laundry composition, including a wrapping material, a functional material enveloped in the wrapping material, and an adhesive for bonding the wrapping material; the wrapping material is a film-forming material with laundry function; the functional material is selected from one or more of a softening particle, a fragrant particle, an active oxygen particle, and an enzyme preparation.

Further, a weight ratio of the wrapping material to the functional material is 1:(1~3).

Further, the functional material includes the softening particle, the fragrant particle, the active oxygen particle, and the enzyme preparation; and a weight ratio of the softening particle to the fragrant particle to the active oxygen particle to the enzyme preparation is 1:(2~4):(0.1~2):(0.01~0.5).

Further, by mass percentage, the wrapping material is prepared from raw materials of 1~5% of a first film-forming agent, 10~20% of a second film-forming agent, 10~30% of a surfactant, 1~10% of an extender, 0~5% of a bacteriostatic agent, 0~1% of pigment, and a margin of water.

Further, the first film-forming agent is selected from one or more of polyvinyl alcohol, polyvinylether, and polyvinyl pyridine.

Further, the second film-forming agent is selected from one or more of cationic modified starch, modified cellulose, modified hemicellulose, and modified lignin.

Further, the surfactant is selected from one or more of dodecyl sulfate, dodecyl sulfonate, α-alkenyl sulfonate, betaine amphoteric surfactant, amino acid surfactant, fatty alcohol polyoxyethylene ether.

Further, the extender is selected from one or more of glycerol, glycerol polymer, alkyl glycoside, and low molecular block polysiloxane.

Further, the bacteriostatic agent is selected from one or more of tropolone, curcumin, dichlorogenic, and para-chloro-meta-xylenol.

A method for preparing a laundry composition, which is used for preparing the above-mentioned laundry composition accordingly, the method includes: preparing a wrapping material; preparing an adhesive; and enveloping a functional material; the method of enveloping a functional material includes: arranging the functional material on one piece of the wrapping material, applying the adhesive around edges of the flaky wrapping material, covering another piece of the wrapping material, sealing and molding the two pieces of the wrapping material by squeezing the edges of the wrapping material to obtain the laundry composition.

Beneficial Effects

The present disclosure provides a laundry composition and a preparation method therefor. By enveloping the functional material in the wrapping material with a detergent function, the laundry composition has integrated functions of cleaning, decontamination, softening, and fragrance-retaining. Furthermore, since the softening particles, granular fragrant particles, granular active oxygen particles, and granular enzyme preparations are not directly added in the wrapping material, even if the wrapping material is formed by high-temperature drying, the functional materials will not lose their effectiveness. This approach addresses the shortcomings of poor performance or high cost associated with directly adding functional components to laundry sheets in the prior art. Additionally, the enveloping effect of the wrapping material isolates the functional components from the external environment, particularly the active oxygen particles and enzyme preparations, preventing their contact with air and better preserving the efficacy of the functional components.

DETAILED DESCRIPTION OF EMBODIMENTS

Figure 1:
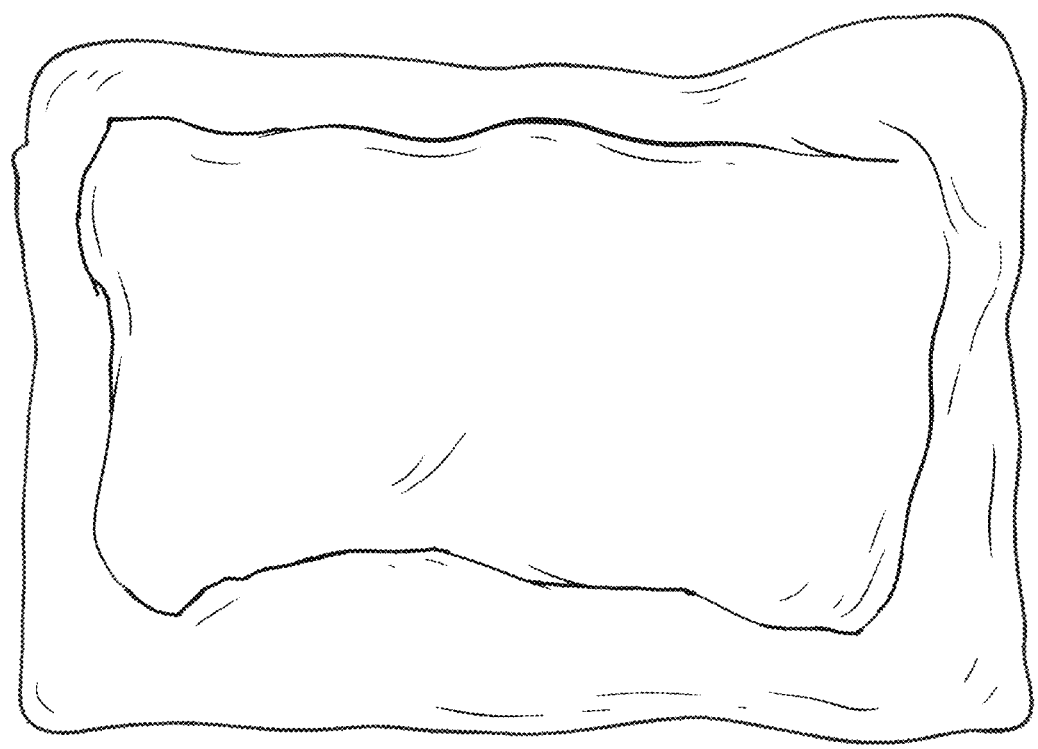
FIG. 1 is a real product picture of a laundry composition in Embodiment 1 of the present disclosure.

The present disclosure provides a laundry composition and a preparation method therefor. In order to make the purposes, technical schemes, and effects of the present disclosure more clear and definite, the present disclosure is further described in detail below attaching with embodiments. It should be understood that the specific embodiments described herein are only used to explain the present disclosure, not to limit the present disclosure.

In the prior art, in order to increase additional functions of laundry tablets, auxiliary components are usually added to the raw material components, for example, in order to make the laundry tablets have fragrance-retaining or softening functions, essence (or essence microcapsule) or softener components are often added, or active oxygen particle or enzyme preparations are added to increase the cleaning efficiency of the laundry tablets. However, during the preparation of the laundry tablets, it is usually necessary to mix all the components evenly, melt them into slurry, and then dry them for molding. The slurry temperature is as high as 100° C. or above. However, under such high temperatures and stirring conditions, the active oxygen particle, and the enzyme preparations are prone to failure, and the essence microcapsules will burst and lead to the early release of fragrance, which makes it impossible to play a corresponding role in the final use. In this way, the existing laundry sheet either has no function except washing, or the corresponding function is obtained by increasing the addition amount of auxiliary components. Which in turn leads to an increase in cost. In addition, even if the added fragrance-retaining components are not essence microcapsules, such as adding free essence, the cleaning function of laundry tablets will be reduced because the free essence will consume surfactants.

Therefore, a first aspect of the present disclosure provides a laundry composition, which can be in a form of tablets, block or bag, and a specific product form can be set according to actual needs. The laundry composition includes a wrapping material, a functional material enveloped in the wrapping material, and an adhesive for bonding the wrapping material. The wrapping material and the functional material can be combined in any ratio according to actual functional requirements, but based on the enveloping requirements, when a weight ratio of the wrapping material to the functional materials is 1:(1-3), the wrapping material can better seal and envelope the functional material, and have better decontamination function and other auxiliary functions. The wrapping material is a film-forming material with laundry function, such as a film-forming flaky laundry film or laundry tablets, which has a cleaning and decontamination effect when dissolved in water and a good molding effect when solidified, and does not adhere to each other. At the same time, the wrapping material needs to have a certain flexibility or ductility. That is, the wrapping material has good tensile strength, and is convenient to form a space for containing the functional material by bonding one or two pieces of wrapping materials to obtain a flaky, massive, or bag-shaped laundry composition with all functions of washing, pliancy, fragrance-retaining, sterilization, cross-color prevention, etc. The functional material includes one or more of a softening particle, a fragrant particle, an active oxygen particle, and an enzyme preparation. Optionally, the functional material includes more of a softening particle, a fragrant particle, an active oxygen particle, and an enzyme preparation. These functional materials are enveloped in the wrapping material to make the laundry composition have softness, fragrance-retaining or better washing effects. The adhesive is used for sealing or edge sealing of the wrapping material, making the functional material be sealed in the wrapping material.

By enveloping the functional material in the wrapping material with a detergent function, the laundry composition has integrated functions of cleaning, decontamination, pliancy, and fragrance-retaining. Furthermore, since the granular softening particles, granular fragrant particles, granular active oxygen particles, and granular enzyme preparations are not directly added in the wrapping material, even if the wrapping material is formed by high-temperature drying, the functional materials will not fail. Therefore, the defects of poor effect or high cost of directly adding the functional materials to the existing laundry tablets can be solved. At the same time, all functional materials, especially the active oxygen particles and the enzyme preparations, can be isolated from outside by the envelopment effect of the wrapping material, which can avoid their contact with air and better retain the efficacy of all functional materials. Furthermore, by controlling an addition amount of the wrapping material and an addition amount of the functional material, the laundry composition can form a washing material having specific amount, which is not only convenient to carry, but also convenient to use, and only needs to be added one or more piece according to the amount of clothes when in use, to achieve functions of washing, pliancy, fragrance-retaining, sterilization, etc.

Because the wrapping material not only plays a role of enveloping the functional material, but also plays a role of washing, the wrapping material needs to have a good molding effect, flexibility or ductility, and the amount of surfactant contained in the wrapping material cannot be reduced. However, the existing laundry tablets usually use polyvinyl alcohol as a carrier, which has good ductility, but is difficult to degrade and useless for detergent function. Therefore, how to reduce the amount of polyvinyl alcohol film-forming materials and improve the molding effect and washing effect of the wrapping material is an urgent problem to be solved. In a better embodiment, by mass percentage, the wrapping material is prepared from raw materials of 1~5% of a first film-forming agent, 10~20% of a second film-forming agent, 10~30% of a surfactant, 1~10% of an extender, 0~5% of a bacteriostatic agent, 0~1% of pigment, and a margin of water. The first film-forming agent is one or more of compounds of polyvinyl alcohol, polyvinylether, and polyvinyl pyridine, but is not limited to the above components and can also be other organic substances with film-forming effect. The film-forming materials have characteristics of less addition but good film-forming effect. The second film-forming agent is one or more of cationic modified starch, modified cellulose, modified hemicellulose, and modified lignin, but is not limited to the above components, and can also be other substances with film-forming effect and easy degradation in the environment. These kinds of substances can form a film and can be decomposed by microorganisms after being dissolved in water, so it is more environmentally friendly. In addition, this kind of film-forming agent also has gelation or flocculation after being dispersed in water, which can adsorb anionic pigments, and then play a role in preventing cross-color. The extender is one or more of glycerol, glycerol polymer, alkyl glycoside, and low molecular block polysiloxane, but is not limited to the above components, and can also be other compounds with the same function. The extender can act on the first film-forming agent and the second film-forming agent to improve the ductility of the wrapping material and can avoid cracking of the wrapping material, thus making the wrapping material have better encapsulation effect on the functional material. The surfactant is one or more of dodecyl sulfate, dodecyl sulfonate, α-alkenyl sulfonate, betaine amphoteric surfactant, amino acid surfactant, fatty alcohol polyoxyethylene ether, but is not limited to the above surfactants, and may also be other components with the same function. The surfactant has a good washing effect, which can effectively remove stains from clothes and clean clothes better. The bacteriostatic agent is one or more of combination of tropolone, curcumin, dichlorogenic (HP-100), and para-chloro-meta-xylenol (PCMX), so that the laundry composition has a good bacteriostatic effect.

In the wrapping material, degradable materials including cationic modified starch, modified cellulose, modified hemicellulose and modified lignin ether are used to replace polyvinyl alcohol which is difficult to degrade, and at the same time, combined with the function of the extender, not only the amount of the first film-forming agent, which is difficult to degrade, is greatly reduced to achieve the purpose of plastic reduction, but also the wrapping material can have better molding effect and flexibility, thus providing better encapsulation effect on the functional material. Meanwhile, the film-forming agents such as cationic modified starch, modified cellulose, modified hemicellulose and modified lignin have the function of colloid or flocculant in water, which can adsorb anionic pigments and play a role in preventing cross-color.

In a better embodiment, the functional material includes the softening particle, the fragrant particle, the active oxygen particle, and the enzyme preparation. Therefore, the laundry composition has a variety of functions, in the decontamination effect is enhanced, which can make the clothes more flexible and have a fragrance effect.

In a better embodiment, a weight ratio of the wrapping material to the functional material is 1:2, and a weight ratio of the supple agent to the fragrant particle to the active oxygen particle to the enzyme preparation is 1:(2~4):(0.1~2):(0.01~0.5). The laundry composition with the weight ratio has a better decontamination effect and a fragrance-remaining effect, and makes the clothes softer.

In a better embodiment, the active oxygen particle in the functional material takes percarbonate or persulfate as a base material and envelopes particle material formed by a water-soluble inert film outer the base material. The active oxygen particle can release oxygen in water, which can degrade organic stains and improve the cleaning effect of the laundry composition.

In a better embodiment, the enzyme preparation in the functional material is at least one of protease, cellulase, amylase, lipase, and pectinase, and such enzyme preparation can synergistically improve the cleaning effect of the surfactants on clothes and have a better cleaning effect under the condition of reducing the amount of laundry composition.

In a better embodiment, the enzyme preparation is a combination of protease, cellulase, amylase, lipase and pectinase provided by Novozymes Co., and the weight ratio of the protease to the cellulase to the amylase to the lipase and to the pectinase is 5:5:3:1:1. A granular enzyme preparation with such weight ratio has excellent cleaning effect.

In a better embodiment, the fragrant particle in the functional material is an essence microcapsule, which is easy to attach to the surface of clothes, releases fragrance after friction explosion or exposure to oxygen, and has a fragrance-remaining-retaining effect. Preferably, the fragrance particle is fragrance particle of HALOSCENT D-type, HALOSCENT I-type, or HALOSCENT E-type provided by Firmenich Co., which can release different kinds of fragrance when exposed to oxygen, and have the effects of diversified fragrance levels and fragrance-remaining release time.

In a better embodiment, the softening particle in the functional material is a high concentration softener bead. Preferably, the softening particle is softener bead products of the WS series provided by Foshan Magic Crystal Technology Development Co., LTD., which have a better effect of softening clothes.

In a better embodiment, the adhesive includes bacteriostat, modified cationic starch or modified cellulose. The adhesive is dichlorogenic (HP-100) or para-chloro-meta-xylenol (PCMX), which has antibacterial and mildewproof effects. The modified cationic starch or the modified cellulose not only has the function of bonding but also has the function of preventing cross-color.

In a second aspect, the present disclosure provides a method for preparing the laundry composition, including preparing a wrapping material, preparing an adhesive, and enveloping a functional material.

Specifically, the method of preparing a wrapping material includes:

S1, stirring and mixing part of water (30~50% of the total water) with a first film-forming agent at normal temperature; S2, adding a surfactant, heating to 55~80° C., and uniformly stirring; S3, stopping heating, adding a second film-forming agent and pigment, and stirring at high speed until the material is in a dense cream state; S4, adding rest water (50~70% of the total water), cooling the material to 40~60° C., then adding an extender and a bacteriostatic agent, and stirring uniformly; S5, making the material into a film or a tablet with a thickness of 0.05~0.3 cm at 105~115° C., rolling and cutting to obtain the flaky wrapping material.

Specifically, the method of preparing an adhesive includes:

Stirring a cationic modified starch or modified cellulose uniformly with water, heating to 60~85° C. for gelatinization, cooling to 35~40° C. after the gelatinization, then adding a bacteriostatic agent and stirring uniformly to obtain the adhesive.

Specifically, the method of enveloping a functional material includes:

Arranging the functional material on one piece of the wrapping material, enveloping the adhesive around edges of the flaky wrapping material, covering another piece of the wrapping material, sealing and molding the two pieces of the wrapping material by squeezing the edges of the wrapping material to obtain the laundry composition.

Of course, the method of enveloping the functional material includes other solutions, for instance, arranging the functional material on a piece of wrapping material, and then bonding the edges of the wrapping material with the adhesive to encapsulate the functional material in the wrapping material.

To further describe the laundry composition and the method therefor in the present disclosure, the following embodiments are provided.

Embodiment 1

A laundry composition in the form of bag, as shown a real product picture in FIG. 1, the laundry composition includes a wrapping material, a functional material, and an adhesive.

The weight ratio of the wrapping material to the functional materials is 1:2. The functional material is enveloped in the wrapping material, and the adhesive is used for bonding and sealing the wrapping material.

Specifically, by mass percentage, the wrapping material is prepared from raw materials of 3% of polyvinyl alcohol, 15% of cationic modified starch, 10% of dodecyl sulfate, 15% of dodecyl sulfonate, 5% of glycerol, 2% of tropolone, 1% of pigment, and 49% of water.

The functional material includes a granular supple agent, a fragrant particle, an active oxygen particle, and the enzyme preparation; and a weight ratio of the granular supple agent to the fragrant particle to the active oxygen particle to the enzyme preparation is 1:3:1:0.3.

The adhesive includes modified cationic starch and bacteriostatic agent with a weight ratio of 10:1.

The laundry composition is prepared by following steps:

Preparing the Wrapping Material:

S1, stirring and mixing part of water with polyvinyl alcohol at normal temperature; S2, adding dodecyl sulfate and dodecyl sulfonate, heating to 75° C., and uniformly stirring; S3, stopping heating, adding cationic modified starch and pigment, and stirring at high speed until the material is in a dense cream state; S4, adding rest water, cooling the material to 55° C., then adding glycerol and tropolone, and stirring uniformly; S5, making the material into a film or a tablet with a thickness of 0.2 cm at 110° C., rolling and cutting to obtain the flaky wrapping material.

Preparing the Adhesive Includes:

Stirring cationic modified starch or modified cellulose uniformly with water, heating to 75° C. for gelatinization, cooling to 38° C. after the gelatinization, then adding bacteriostatic agent and stirring uniformly to obtain the adhesive.

Enveloping the Functional Material Includes:

Arranging the functional material on one piece of the wrapping material, enveloping the adhesive around edges of the flaky wrapping material, covering another piece of the wrapping material, sealing and molding the two pieces of the wrapping material by squeezing the edges of the wrapping material to obtain the laundry composition.

Embodiment 2

A laundry composition includes a wrapping material, a functional material, and an adhesive. The weight ratio of the wrapping material to the functional materials is 1:1. The functional material is enveloped in the wrapping material, and the adhesive is used for bonding and sealing the wrapping material.

Specifically, in percentage by mass, the wrapping material is prepared from raw materials of 1% of polyvinylether, 20% of modified cellulose, 15% of α-alkenyl sulfonate, 15% of betaine amphoteric surfactant, 10% of alkyl polyglycoside, and 39% of water.

The functional material includes a granular supple agent, a fragrant particle, an active oxygen particle and an enzyme preparation; and a weight ratio of the granular supple agent to the fragrant particle to the active oxygen particle to the enzyme preparation is 1:2:0.1:0.01.

The adhesive includes modified cellulose and bacteriostatic agent with a weight ratio of 10:1.

Embodiment 3

A laundry composition includes a wrapping material, a functional material, and an adhesive. The weight ratio of the wrapping material to the functional materials is 1:3. The functional material is enveloped in the wrapping material, and the adhesive is used for bonding and sealing the wrapping material.

Specifically, in percentage by mass, the wrapping material is prepared from raw materials of 5% of polyvinyl pyridine, 10% of modified hemicellulose, 10% of betaine amphoteric surfactant, 1% of low molecular block polysiloxane, 5% of HP-100, 1% of pigment, and 68% of water.

The functional material includes a granular supple agent, a fragrant particle, an active oxygen particle and an enzyme preparation; and a weight ratio of the granular supple agent to the fragrant particle to the active oxygen particle to the enzyme preparation is 1:4:2:0.5.

The adhesive includes cationic modified starch and bacteriostatic agent with a weight ratio of 10:1.

Embodiment 4

A laundry composition includes a wrapping material, a functional material, and an adhesive. The weight ratio of the wrapping material to the functional materials is 1:2. The functional material is enveloped in the wrapping material, and the adhesive is used for bonding and sealing the wrapping material.

Specifically, in percentage by mass, the wrapping material is prepared from raw materials of 2% of polyvinyl alcohol, 18% of modified lignin, 28% of amino acid surfactant, 7% of glycerol polymer, 2% of PCMX, 1% of pigment, and 42% of water.

The functional material includes a granular supple agent, a fragrant particle, an active oxygen particle and an enzyme preparation; and a weight ratio of the granular supple agent to the fragrant particle to the active oxygen particle to the enzyme preparation is 1:3:0.5:0.05.

The adhesive includes cationic modified starch and bacteriostatic agent with a weight ratio of 10:1.

Embodiment 5

A laundry composition includes a wrapping material, a functional material, and an adhesive. The weight ratio of the wrapping material to the functional materials is 1:2.5. The functional material is enveloped in the wrapping material, and the adhesive is used for bonding and sealing the wrapping material.

Specifically, in percentage by mass, the wrapping material is prepared from raw materials of 4% of polyvinyl alcohol, 13% of cationic modified starch, 22% of fatty alcohol polyoxyethylene ether, 4% of glycerol, 1% of tropolone, 2% of HP-100, 1% of pigment, and 53% of water.

The functional material includes a granular supple agent, a fragrant particle, an active oxygen particle and an enzyme preparation; and a weight ratio of the granular supple agent to the fragrant particle to the active oxygen particle to the enzyme preparation is 1:2.5:1.5:0.1.

The adhesive includes cationic modified starch and bacteriostatic agent with a weight ratio of 10:1.

Embodiment 6

A laundry composition which is basically the same as Embodiment 1, the difference is that the weight ratio of the wrapping material to the functional materials is 1:1, and the functional material includes a fragrant particle.

The method for preparing the laundry composition in Embodiments 2 to 6 is basically the same as Embodiment 1.

Embodiment 7

Figure 2:
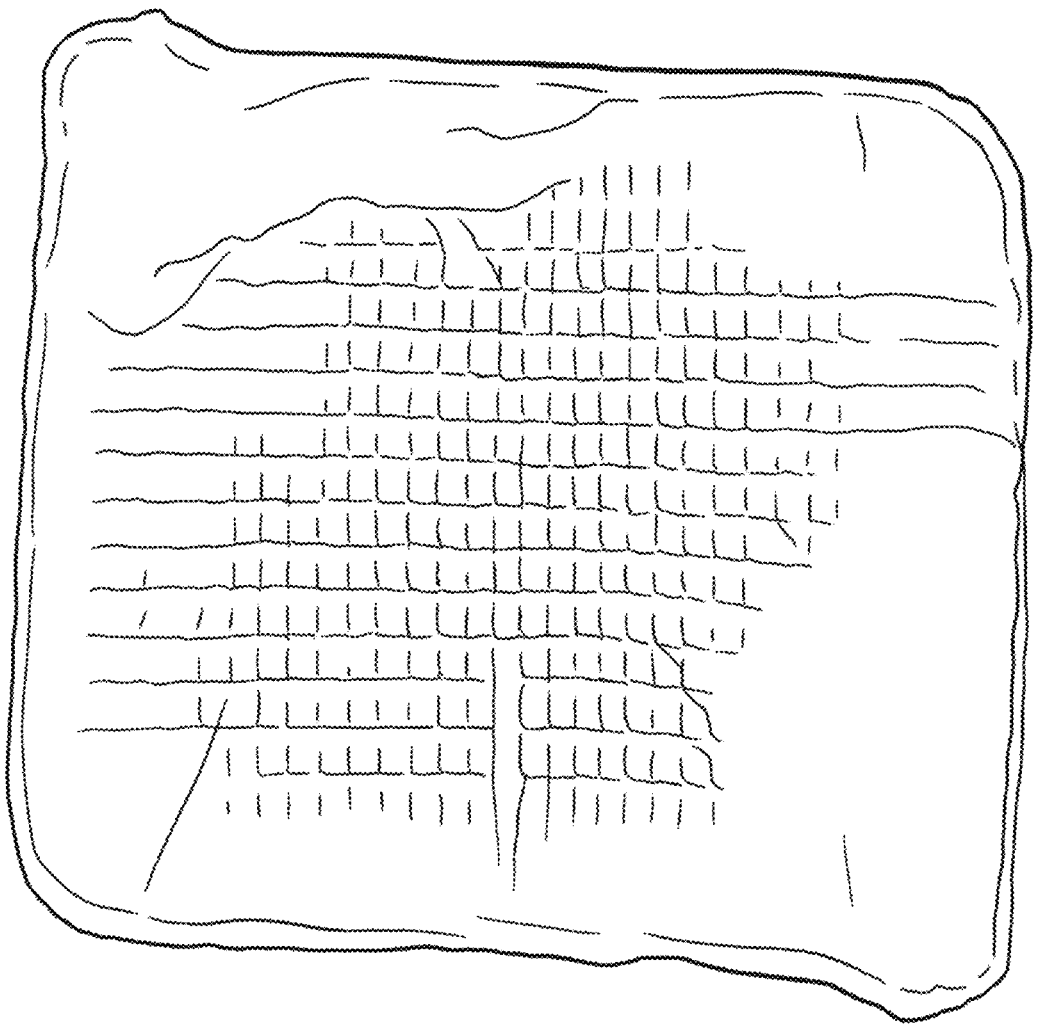
FIG. 2 is a real product picture of a laundry composition in Embodiment 7 of the present disclosure.

A laundry composition in form of block, as shown a real product picture in FIG. 2, the laundry composition is basically the same as Embodiment 1, the difference is that the weight ratio of the wrapping material to the functional materials is 1:1, and the functional material includes a softening particle.

Embodiment 8

A laundry composition in form of block, which is basically the same as Embodiment 1, the difference is that the weight ratio of the wrapping material to the functional materials is 1:1.5, and the functional material includes a combination of a softening particle and an active oxygen particle. A weight ratio of the softening particle to the active oxygen particle is 2:1.

Embodiment 9

A laundry composition in form of block, which is basically the same as Embodiment 1, the difference is that the weight ratio of the wrapping material to the functional materials is 1:2, and the functional material includes a combination of a softening particle, an active oxygen particle, and an enzyme preparation. A weight ratio of the softening particle to the active oxygen particle to the enzyme preparation is 1:1:0.3.

The method for preparing the laundry composition in Embodiments 7 to 9 is basically the same as Embodiment 1. The difference is in the process of enveloping, while squeezing the edges of the wrapping material, a middle part of the wrapping material is also squeezed to make the laundry composition form a block.

Comparative Example 1

A laundry tablet, by weight parts, the wrapping material is prepared from raw materials of 3 parts of polyvinyl alcohol, 15 parts of cationic modified starch, 10 parts of dodecyl sulfate, 15 parts of dodecyl sulfonate, 5 parts of glycerol, 2 parts of tropolone, 50 parts of water, 37.73 parts of softener, 113.2 parts of fragrant agent, 37.73 parts of active oxygen particle and 16.98 parts of enzyme preparation.

A method for preparing the laundry tablet includes:
Stirring and mixing half water and polyvinyl alcohol at normal temperature; Adding surfactant, heating to 65° C., and stirring uniformly; Stop heating, adding cationic modified starch and pigment, and stirring at high speed until the material is in a dense cream state; adding remaining water, cooling the material to 50° C., then adding the extender, the bacteriostatic agent, the softener, the fragrant particle, the active oxygen particle, and the enzyme preparation, and uniformly stirring; Pressing the material at 110° C. into a film or a tablet with a thickness of 0.2 cm, cutting to obtain the laundry tablets.

Comparative Example 2

A laundry composition which is basically the same as Embodiment 1, the difference is that the cationic modified starch is completely replaced by the polyvinyl alcohol.

Comparative Example 3

A laundry composition which is basically the same as Embodiment 1, the difference is that the polyvinyl alcohol is completely replaced by the cationic modified starch.

Performance Test

Performances of Embodiments 1-5 and Comparative Examples 1-3 were tested, including detergency, pliancy, fragrance-retaining and anti-cross-color. The testing method of detergency was based on the determination of detergency and cyclic washing performance of detergents for clothing in GB/T 13174-2021, and was evaluated by the relative standard detergent decontamination ratio. The softening effect was tested according to GB/T 18318.1-2009, and expressed by the straight bending length reduction value ΔL, and $$\Delta L = \left| \frac{L_{after} - L_{before}}{L_{after}} \right| \times 100\%,$$

where ΔL was a change value of bending length of the fabric before and after treatment which was accurate to one decimal point, $L_{before}$ is a bending length of the fabric before treatment, with units in cm, $L_{after}$ is a bending length of the fabric after treatment, with units in cm. The smaller the vertical bending length, the better the softening effect of the laundry composition. A pretreatment method was as follows: fully dissolving the laundry composition with deionized water, putting into a cloth sample to be tested at the liquor ratio of 1:50, stirring and soaking for 20 min (stirring once every 5 min, stirring for 30 s each time), taking out the cloth sample, dehydrating and drying the cloth sample at 80° C. for later use. The fragrance-retaining effect was expressed according to a static fragrance-retaining intensity ΔT of the clothes sample after washing, and ΔT is evaluated with the aroma intensity of towels and clothes washed, dried and placed in a wardrobe for 4 weeks, 8 weeks, and 12 weeks by a professional evaluation team. An intensity of fragrance, from weak to strong, was expressed by 1-7 points respectively: 1 point-tasteless, 2 points-faint, 3 points-weak, 4 points-medium; 5 points-relatively strong, 6 points-strong, 7-very strong. A pretreatment method was as follows: preparing 20 g of laundry composition to be tested, three towels to be washed and three clothes to be washed, and putting them into a straight barrel washing machine; setting a standard washing mode and washing for 50 min; after drying the towels and the clothes in a clothes drying room and putting them in the wardrobe, evaluating fragrance according to different time periods. The anti-cross-color effect was tested according to the A(1) test condition in GB/T 3921-2008, and was evaluated by using the gray sample card for GB 251 (ISO 105-A03) staining. Test conditions were: rotating speed of (40±2) rad/min, water temperature of (40±2° C.), washing time of 30 min, liquor ratio of 50:1, laundry composition amount of 10 g/L, clothing category and a weight ratio of the clothing, blue cotton brand-new jeans to black cotton brand-new jeans to white multi-fiber clothes is 1:1:1, and total weight about 1.2 kg. After washing, white multi-fiber clothes were taken out, and washed twice with three-level clean water, then cleaned in flowing water, dehydrated, and dried in the air below 60° C. The specific test results of evaluating the staining level of the multi-fiber clothes (the higher the level, the less staining) are shown in Table 1 below.

TABLE 1

Detergency ratio

|  | JB-01 | JB-02 | JB-03 |
|---|---|---|---|
| Embodiment 1 | 1.14 | 1.30 | 1.28 |
| Embodiment 2 | 0.57 | 0.65 | 0.65 |
| Embodiment 3 | 1.40 | 1.60 | 1.58 |
| Embodiment 4 | 0.66 | 0.75 | 0.75 |
| Embodiment 5 | 1.18 | 1.35 | 1.34 |
| Embodiment 6 | 0.50 | 0.57 | 0.57 |
| Embodiment 7 | 0.50 | 0.57 | 0.57 |
| Embodiment 8 | 1.20 | 1.37 | 1.36 |
| Embodiment 9 | 1.83 | 2.09 | 2.07 |
| Comparative Example 1 | 0.67 | 0.77 | 0.76 |
| Comparative Example 2 | 1.00 | 1.12 | 1.20 |
| Comparative Example 3 | 1.07 | 1.19 | 1.22 |

As shown in Table 1, in Embodiments 1-9, the detergency of the laundry composition is related to the addition amount of the surfactant, the active oxygen particle, and the enzyme preparation, and the detergency effect is better with the increase of the addition amount of these components. However, from Comparative Example 1, it can be seen that the composition ratio is the same as that of Embodiment 1, but the preparation method adopted the way of stirring, melting, mixing and pressing to form, which leaded to a great decline in detergency. It can be seen that better decontamination effect can be achieved by preparing the wrapping materials separately from the functional material and then enveloping them.

TABLE 2

Decreased value of bending length

|  | Decreased value of bending length $\Delta L/\%$ |
|---|---|
| Embodiment 1 | 53 |
| Embodiment 2 | 61 |
| Embodiment 3 | 15 |
| Embodiment 4 | 45 |
| Embodiment 5 | 40 |
| Embodiment 6 | 4 |
| Embodiment 7 | 400 |
| Embodiment 8 | 300 |
| Embodiment 9 | 187 |
| Comparative Example 1 | 3.5 |
| Comparative Example 2 | 50 |
| Comparative Example 3 | 52 |

As shown in Table 2, in Embodiments 1-9, the decreased value of bending length is related to the addition amount of the softener, and is increased with the increase of the addition amount of the softener. However, from Comparative Example 1, it can be seen that the laundry composition prepared by traditional preparation method, even if the ingredients of the softener are the same, the softening effect is very different. It can be seen that the softener can be prevented from failing in the preparation process by enveloping with the wrapping material.

TABLE 3

Static fragrance-retaining intensity

| | Static fragrance-retaining intensity $\Delta T$ | | |
|---|---|---|---|
|  | 4$^{th}$ week | 8$^{th}$ week | 12$^{th}$ week |
| Embodiment 1 | 7 | 6 | 5 |
| Embodiment 2 | 5.5 | 4 | 3 |
| Embodiment 3 | 7 | 6 | 5 |
| Embodiment 4 | 6.5 | 6 | 5 |
| Embodiment 5 | 6 | 5 | 4 |
| Embodiment 6 | 7 | 6 | 5.5 |
| Embodiment 7 | 1 | 1 | 1 |
| Embodiment 8 | 1 | 1 | 1 |
| Embodiment 9 | 1 | 1 | 1 |
| Comparative Example 1 | 4 | 3 | 2 |
| Comparative Example 2 | 7 | 6 | 5 |
| Comparative Example 3 | 7 | 6 | 5 |

As shown in Table 3, in Embodiments 1-9, the fragrance-retaining effect is related to the addition amount of the fragrance particle, and is improved with the increase of the addition amount of fragrance particle. However, from Comparative Example 1, in the case that the addition amount of the fragrance particle is the same as that in Embodiment 1, the fragrance-retaining effect is poor, which may be resulted from the fragrance particle being broken during preparation of the traditional method, leading to the early release of fragrance particle.

TABLE 4

Staining level

|  | Wool | Acrylic fibre | Terylene | Nylon | Cotton | Polyester fibre |
|---|---|---|---|---|---|---|
| Embodiment 1 | 2~3 level | 2~3 level | 2~3 level | 2~3 level | 2~3 level | 2~3 level |
| Embodiment 2 | 4~5 level | 4~5 level | 4~5 level | 4~5 level | 4~5 level | 4~5 level |
| Embodiment 3 | 2 level | 2 level | 2 level | 2 level | 2 level | 2 level |
| Embodiment 4 | 3 level | 3 level | 3 level | 3 level | 3 level | 3 level |
| Embodiment 5 | 2~3 level | 2~3 level | 2~3 level | 2~3 level | 2~3 level | 2~3 level |
| Embodiment 6 | 2~3 level | 2~3 level | 2~3 level | 2~3 level | 2~3 level | 2~3 level |
| Embodiment 7 | 5 level | 5 level | 5 level | 5 level | 5 level | 5 level |
| Embodiment 8 | 4 level | 4 level | 4 level | 4 level | 4 level | 4 level |
| Embodiment 9 | 3~4 level | 3~4 level | 3~4 level | 3~4 level | 3~4 level | 3~4 level |
| Comparative Example 1 | 2 level | 2 level | 2 level | 2 level | 2 level | 2 level |
| Comparative Example 2 | 2~3 level | 2~3 level | 2~3 level | 2~3 level | 2~3 level | 2~3 level |
| Comparative Example 3 | 3 level | 3 level | 3 level | 3 level | 3 level | 3 level |

As shown in Table 4, in Embodiments 1-9, the staining level is related to a addition amount of the softener. The more the amount of softener, the higher the staining level, and the stronger the anti-cross-color ability. However, from Comparative Example 1, in the case that the addition amount of the softener is the same as that in Embodiment 1, the staining level is poor, which may be caused by the loss of softener in the preparation process. The anti-cross-color ability in the Comparative Example 3 is better than in Embodiment 1, probably due to the cation modified starch can absorb part of the pigment.

In addition, according to GB/T 3923.1-1997, a tensile test was performed on the wrapping material prepared from Embodiments 1-5 and the Comparative Examples 2-3, and the tensile test method was compared with the fracture force (cutting the wrapping material into 5 cm wide and 11 cm long strips, clamping the two legs with a stretching machine, and pulling the wrapping material at a uniform speed until it broken, recording the maximum tensile value of the wrapping material when broken, in N). The specific test results are shown in Table 5.

TABLE 5

| | Breaking strength/N |
|---|---|
| Breaking strength | |
| Embodiment 1 | 11.45 |
| Embodiment 2 | 12.00 |
| Embodiment 3 | 10.91 |
| Embodiment 4 | 12.00 |
| Embodiment 5 | 11.45 |
| Comparative Example 2 | 19.63 |
| Comparative Example 3 | 9.81 |

As shown in Table 5, the breaking strength of the wrapping material is related to the addition amount and the type of the first film-forming agent. The breaking strength of the wrapping material in Embodiments 1-5 is in 10.91 N or above, which can ensure that the functional material does not break during the enveloping process. According to Comparative Example 3, when the first film-forming agent is not added to the wrapping material, its breaking strength is 9.819 N. However, it is found through experiments that when the breaking strength of the wrapping material is less than 10 N, it is easy to break during the enveloping process, so it is necessary to add the first film-forming agent with better breaking strength to the wrapping material. However, because polyvinyl alcohol is difficult to degrade, the addition of the first film-forming agent should be reduced as much as possible under the condition of ensuring that the wrapping material can meet the breaking strength.

It should be understood that those skilled in the art can make improvements or transformations according to the above descriptions, and all these improvements and transformations should belong to the protection scope of the appended claims of the present disclosure.

What is claimed is:

1. A laundry composition, comprising: a wrapping material, a functional material enveloped in the wrapping material, and an adhesive for bonding the wrapping material; wherein the wrapping material is a film-forming material with laundry function; and the functional material is selected from the group consisting of: a softening particle, a fragrant particle, an active oxygen particle, an enzyme preparation and mixtures thereof;
wherein by mass percentage, the wrapping material is prepared from raw materials of 3~5% of a first film-forming agent, 10~20% of a second film-forming agent, 10~30% of a surfactant, 1~10% of an extender, 0~5% of a bacteriostatic agent, 0~1% of pigment, and balance is water;
wherein the first film-forming agent is selected from the group consisting of: polyvinyl alcohol, polyvinylether, and polyvinyl pyridine;
wherein the second film-forming agent is selected from the group consisting of: cationic modified starch, modified cellulose, modified hemicellulose, and modified lignin.

2. The laundry composition according to claim 1, wherein a weight ratio of the wrapping material to the functional material is 1:(1~3).

3. The laundry composition according to claim 2, wherein the functional material comprises the softening particle, the fragrant particle, the active oxygen particle, and the enzyme preparation; and a weight ratio of the softening particle to the fragrant particle to the active oxygen particle to the enzyme preparation is 1:(2~4):(0.1~2):(0.01~0.5).

4. The laundry composition according to claim 1, wherein the surfactant is selected from the group consisting of: dodecyl sulfate, dodecyl sulfonate, α-alkenyl sulfonate, betaine amphoteric surfactant, amino acid surfactant, and fatty alcohol polyoxyethylene ether.

5. The laundry composition according to claim 1, wherein the extender is selected from the group consisting of: glycerol, glycerol polymer, alkyl glycoside, and block polysiloxane.

6. The laundry composition according to claim 1, wherein the bacteriostatic agent is selected from the group consisting of: tropolone, curcumin, dichlorogenic, and para-chloro-meta-xylenol.

7. A method for preparing a laundry composition according to claim 1, wherein the method comprises: preparing the wrapping material; preparing the adhesive; and enveloping the functional material; wherein the method of enveloping the functional material comprises: arranging the functional material on one piece of the wrapping material, applying the adhesive around edges of the wrapping material, covering with another piece of the wrapping material, sealing and molding the two pieces of the wrapping material by squeezing the edges of the wrapping material to obtain the laundry composition.

8. A laundry composition, comprising: a wrapping material, a functional material enveloped in the wrapping material, and an adhesive for bonding the wrapping material; wherein the wrapping material is a film-forming material with laundry function; and the functional material is selected from the group consisting of: a softening particle, a fragrant particle, an active oxygen particle, an enzyme preparation and mixtures thereof; wherein by mass percentage, the wrapping material consists of 1~5% of a first film-forming agent, 10~20% of a second film-forming agent, 10~30% of a surfactant, 1~10% of an extender, 0~5% of a bacteriostatic agent, 0~1% of pigment, and balance is water;
wherein the first film-forming agent is selected from the group consisting of: polyvinyl alcohol, polyvinylether, and polyvinyl pyridine;
wherein the second film-forming agent is selected from the group consisting of: cationic modified starch, modified hemicellulose, and modified lignin.

\* \* \* \* \*